US008907959B2

(12) United States Patent
Li et al.

(10) Patent No.: US 8,907,959 B2
(45) Date of Patent: Dec. 9, 2014

(54) METHOD FOR PERFORMING VIDEO DISPLAY CONTROL WITHIN A VIDEO DISPLAY SYSTEM, AND ASSOCIATED VIDEO PROCESSING CIRCUIT AND VIDEO DISPLAY SYSTEM

(75) Inventors: Guoping Li, Hefei (CN); Chin-Jung Yang, Hsinchu (TW); Shih-Rong Kao, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 781 days.

(21) Appl. No.: 13/130,305

(22) PCT Filed: Sep. 26, 2010

(86) PCT No.: PCT/CN2010/077319
§ 371 (c)(1),
(2), (4) Date: May 20, 2011

(87) PCT Pub. No.: WO2012/037734
PCT Pub. Date: Mar. 29, 2012

(65) Prior Publication Data
US 2012/0113327 A1    May 10, 2012

(51) Int. Cl.
*G06T 1/00* (2006.01)
*G06T 15/00* (2011.01)
*G06T 1/60* (2006.01)
*H04N 5/76* (2006.01)
*H04N 21/44* (2011.01)

(52) U.S. Cl.
CPC ........... *H04N 5/76* (2013.01); *H04N 21/44004* (2013.01); *H04N 21/44008* (2013.01)
USPC .......................................... 345/522; 345/530

(58) Field of Classification Search
CPC ....... G06T 1/00–1/0092; G06T 15/00–15/005; G06T 1/60; G06F 13/00; G09G 5/36–5/366
USPC .................................. 345/522, 530, 536, 545
See application file for complete search history.

(56) References Cited

U.S. PATENT DOCUMENTS

| 5,933,155 A | 8/1999 | Akeley |
| 7,463,819 B2 | 12/2008 | Law |
| 2006/0104599 A1* | 5/2006 | Law et al. ........................ 386/46 |
| 2007/0070074 A1* | 3/2007 | Jiang ............................ 345/539 |

FOREIGN PATENT DOCUMENTS

| CN | 1968383 A | 5/2007 |
| CN | 101025913 A | 8/2007 |

OTHER PUBLICATIONS

International application No. PCT/CN2010/077319, International filing date: Sep. 26, 2010, International Searching Report mailing date: Jul. 7, 2011.

* cited by examiner

*Primary Examiner* — Jacinta M Crawford
(74) *Attorney, Agent, or Firm* — Winston Hsu; Scott Margo

(57) ABSTRACT

A method for performing video processing within a video display system includes: detecting whether dropping at least one frame is required; and when it is detected that dropping the at least one frame is required, removing at least one flip command from a command queue and selectively removing at least one video processing command from the command queue. An associated video processing circuit and an associated video display system are also provided. In particular, the video processing circuit is positioned within the video display system, where the video processing circuit includes a hardware module and a controller, and the controller operates according to the method.

27 Claims, 9 Drawing Sheets

METHOD FOR PERFORMING VIDEO DISPLAY CONTROL WITHIN A VIDEO DISPLAY SYSTEM, AND ASSOCIATED VIDEO PROCESSING CIRCUIT AND VIDEO DISPLAY SYSTEM

TECHNICAL FIELD

The present invention relates to display control, and more particularly, to a method for performing video display control within a video display system, and to an associated video processing circuit and an associated video display system.

BACKGROUND

FIG. 1 illustrates a plurality of commands and associated images of data respectively stored in two buffers Buf(1) and Buf(2) of a conventional video display system implemented according to the related art, where the notations "Draw" and "Flip" shown in FIG. 1 are utilized for representing some drawing commands and flip commands, respectively. For example, the buffer Buf(1) is originally selected as the display buffer, so an image of the earth is initially displayed on the screen. After a set of drawing commands Draw(1) are executed, the data of an image of the heart is temporarily stored in the buffer Buf(2), where the image of the earth is still displayed on the screen. When the flip command Flip(1) is executed, the buffer Buf(2) is selected as the display buffer, so the image of the heart is displayed on the screen. After a set of drawing commands Draw(2) are executed, the data of an image of the question mark is temporarily stored in the buffer Buf(1), where the image of the heart is still displayed on the screen. When the flip command Flip(2) is executed, the buffer Buf(1) is selected as the display buffer, so the image of the question mark is displayed on the screen. Thus, when a flip command (e.g. Flip(1) or Flip(2)) is executed, the buffer that is originally selected as the display buffer can be utilized for drawing without displaying any incomplete image on the screen, while the other buffer can be selected as the latest display buffer, which stores the data of the latest complete image for being displayed on the screen.

According to the related art, referring to FIG. 2, a plurality of flip commands such as the flip commands Flip(1), Flip(2), Flip(3), Flip(4), . . . , etc. may be received in respective periods of a vertical synchronization signal VSYNC. For example, there are 60 pulses per second in a vertical synchronization signal VSYNC. When a flip command such as one of the flip commands Flip(1), Flip(2), Flip(3), Flip(4), . . . , etc. is executed, the associated flip operation is typically performed at a time point of the appearance of the first coming pulse of the vertical synchronization signal VSYNC. In a situation where associated hardware resources of the conventional video display system are implemented with cheap or low end components, without a proper display control scheme being introduced, some problems such as non-smooth display may occur, giving the user a bad viewing experience.

Please note that, in the situation mentioned above, the conventional video display system typically does not serve the user well. Thus, a novel method is required for enhancing the display control of a video display system.

SUMMARY

It is therefore an objective of the claimed invention to provide a method for performing video display control within a video display system, and to provide an associated video processing circuit and an associated video display system, in order to solve the above-mentioned problems.

It is another objective of the claimed invention to provide a method for performing video display control within a video display system, and to provide an associated video processing circuit and an associated video display system, in order to achieve the best overall performance.

It is another objective of the claimed invention to provide a method for performing video display control within a video display system, and to provide an associated video processing circuit and an associated video display system, in order to maintain the overall performance even in a situation where associated hardware resources are implemented with cheap or low end components.

An exemplary embodiment of a method for performing video display control within a video display system comprises: detecting whether dropping at least one frame is required; and when it is detected that dropping the at least one frame is required, removing at least one flip command from a command queue and selectively removing at least one video processing command from the command queue.

An exemplary embodiment of an associated video processing circuit is provided, where the video processing circuit is positioned within a video display system. The video processing circuit comprises a hardware module and a controller. The hardware module is arranged to perform video processing for the video display system. In addition, the controller is arranged to detect whether dropping at least one frame is required, wherein when it is detected that dropping the at least one frame is required, the controller removes at least one flip command from a command queue and selectively removes at least one video processing command from the command queue. Additionally, the hardware module is arranged to perform video processing based upon commands within the command queue.

An exemplary embodiment of an associated video display system comprises a video processing circuit, where the video processing circuit comprises a hardware module and a controller. The hardware module is arranged to perform video processing for the video display system. In addition, the controller is arranged to detect whether dropping at least one frame is required, wherein when it is detected that dropping the at least one frame is required, the controller removes at least one flip command from a command queue and selectively removes at least one video processing command from the command queue. Additionally, the hardware module is arranged to perform video processing based upon commands within the command queue.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
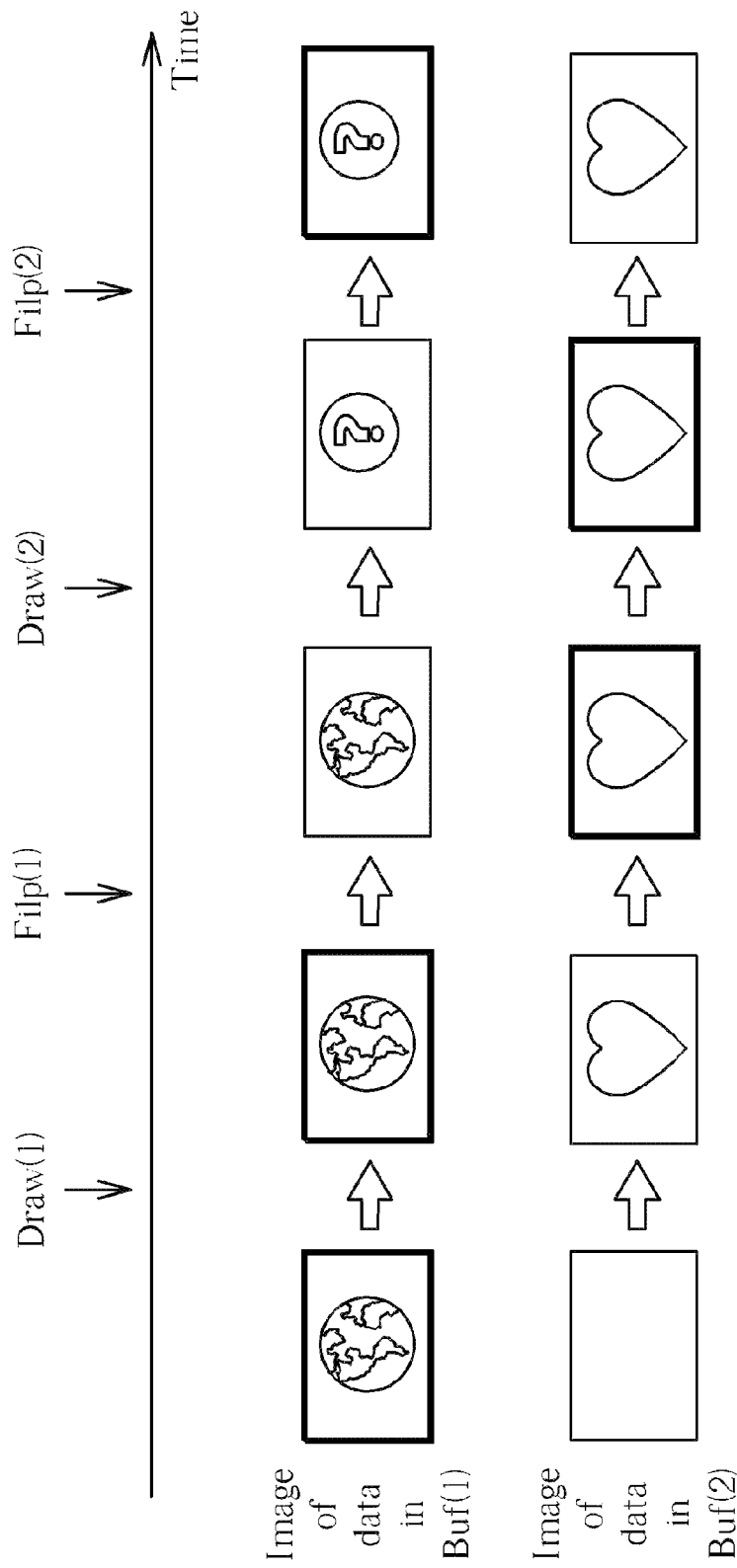
FIG. 1 illustrates a plurality of commands and associated images of data respectively stored in two buffers of a conventional video display system implemented according to the related art.
Figure 2:
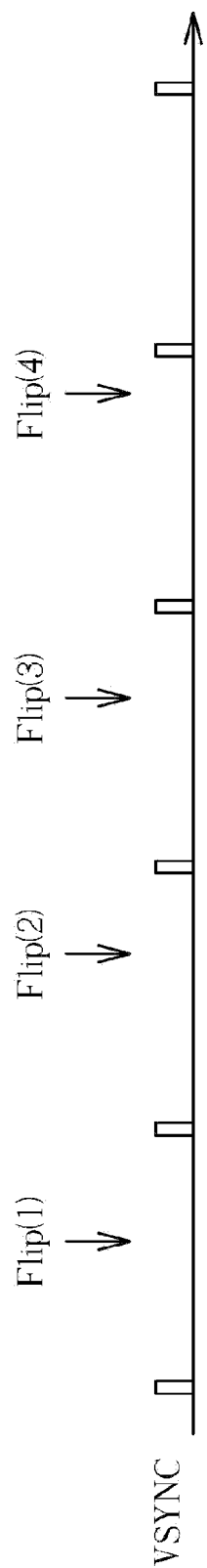
FIG. 2 illustrates a plurality of flip commands received in respective periods of a vertical synchronization signal according to the related art.
Figure 3:
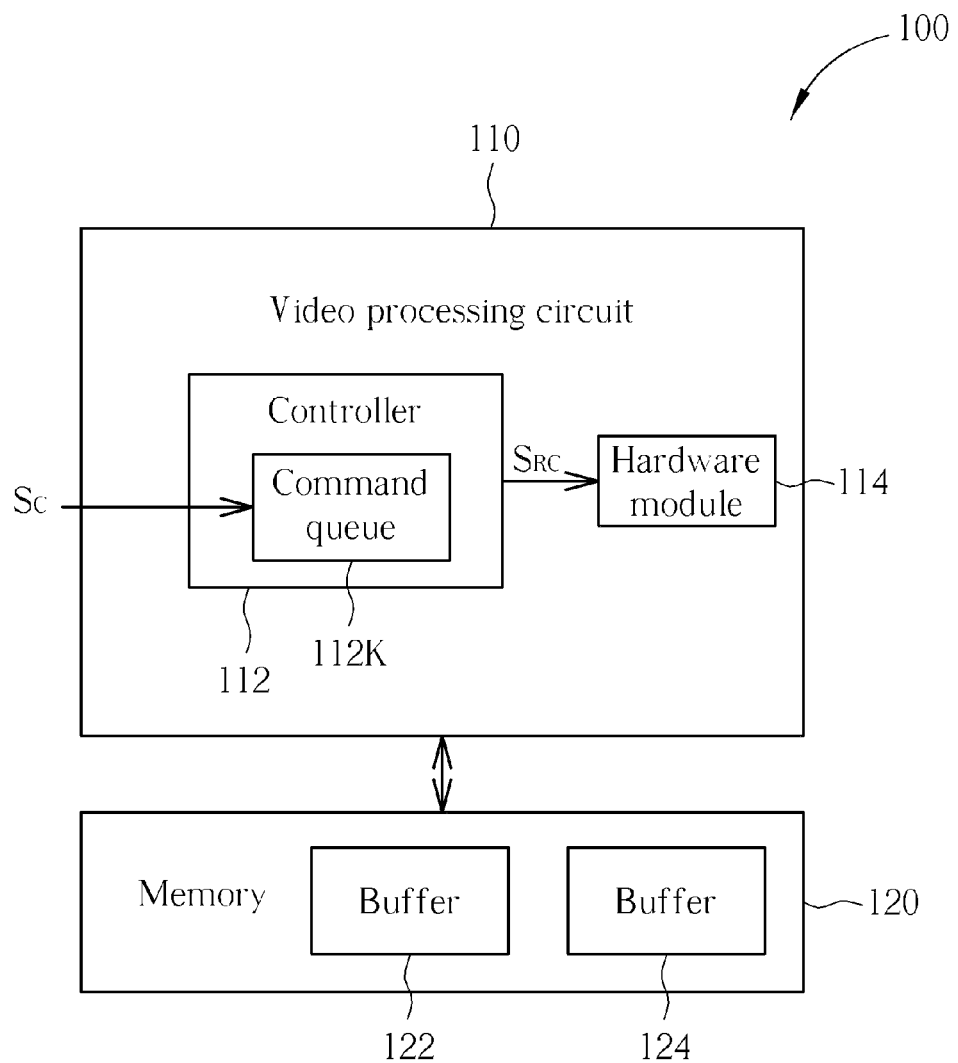
FIG. 3 is a diagram of a video display system according to a first embodiment of the present invention.

Please refer to FIG. 3, which illustrates a diagram of a video display system 100 according to a first embodiment of the present invention. As shown in FIG. 3, the video display system 100 comprises a video processing circuit 110 and at least one memory 120 (e.g. one or more memories), where the video processing circuit 110 comprises a controller 112 and a hardware module 114, and the memory 120 comprises a plurality of buffers such as two buffers 122 and 124. For example, the two buffers 122 and 124 can be implemented as two buffering regions of the memory 120. In another example, the aforementioned at least one memory 120 comprises two memories, where the two buffers 122 and 124 can be implemented as the two memories. In practice, the buffers 122 and 124 can be positioned outside the video processing circuit 110. This is for illustrative purposes only, and is not meant to be a limitation of the present invention. According to a variation of this embodiment, the buffers 122 and 124 can be integrated into the video processing circuit 110. According to another variation of this embodiment, the buffers 122 and 124 can be integrated into another component within the video display system 100.

In addition, the video display system 100 of this embodiment can be implemented as an entertainment device that is capable of accessing data of a video program and utilizing the video processing circuit 110 to process associated data based upon a plurality of commands $S_C$. Please note that, according to this embodiment, the entertainment device mentioned above is taken as an example of the video display system 100. This is for illustrative purposes only, and is not meant to be a limitation of the present invention. According to a variation of this embodiment, the video display system 100 can be implemented as an optical storage device such as a Blu-ray Disc (BD) player. According to some variations of this embodiment, the video display system 100 can be implemented as a digital television (TV) or a digital TV receiver, and comprises a digital tuner (not shown) for receiving broadcasting signals to generate the data of a video program and utilizing the video processing circuit 110 to process associated data based upon a plurality of commands such as the commands $S_C$ shown in FIG. 3.

According to this embodiment, the video processing circuit 110 may receive the commands $S_C$, and utilize a command queue therein to temporarily store the commands $S_C$ and/or representatives thereof, where the hardware module 114 is arranged to perform video processing based upon commands in the command queue, and the controller 112 is capable of altering the commands in the command queue. In particular, the command queue can be implemented as the command queue 112K shown in FIG. 3, where the command queue 112K of this embodiment is positioned within the controller 112. For example, the video processing circuit 110 can be a graphics processing unit (GPU) for three-dimensional (3-D) or two-dimensional (2-D) graphics rendering, where the hardware module 114 can be a core circuit of the GPU. This is for illustrative purposes only, and is not meant to be a limitation of the present invention. According to a variation of this embodiment, the command queue 112K can be positioned outside the controller 112, and more particularly, can be positioned within the hardware module 114. For example, the hardware module 114 can be a GPU for 3-D or 2-D graphics rendering, where controller 112 can be a microprocessor outside the GPU. In particular, the microprocessor of this variation is capable of generating the commands $S_C$ by itself, rather than receiving from outside the microprocessor.

In this embodiment, the hardware module 114 is arranged to perform video processing for the video display system 100, and in a situation where the controller 112 alters the commands in the command queue 112K, the hardware module 114 performs video processing based upon the latest version of the commands in the command queue 112K. In addition, the controller 112 is arranged to detect whether dropping at least one frame is required. When it is detected that dropping the aforementioned at least one frame is required, the controller 112 removes at least one flip command from the command queue 112K and selectively removes at least one video processing command from the command queue 112K.

Based upon the architecture of the first embodiment or any of its variations disclosed above, the video display system 100 can operate smoothly with ease. More particularly, in a situation where associated hardware resources therein are implemented with cheap or low end components, the video display system 100 can still maintain the overall performance since the overall workload can be reduced. Some implementation details are further described according to FIG. 4.

Figure 4:
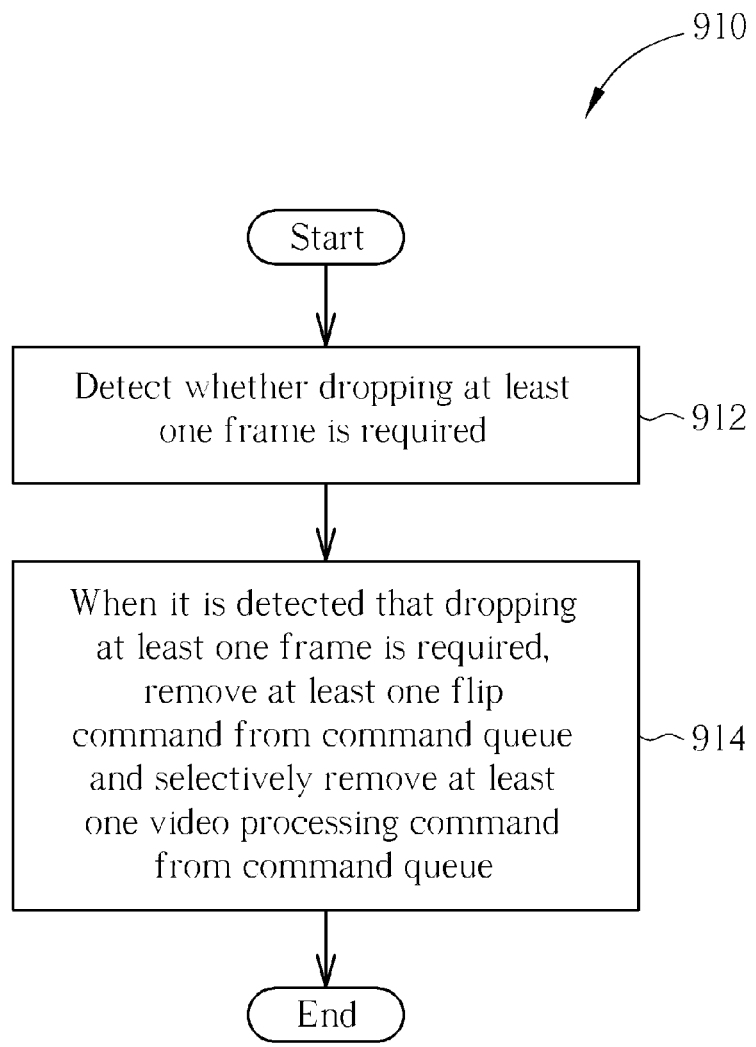
FIG. 4 is a flowchart of a method for performing video display control within a video display system according to one embodiment of the present invention.

FIG. 4 is a flowchart of a method 910 for performing video display control within a video display system such as that mentioned above according to one embodiment of the present invention. The method 910 shown in FIG. 4 can be applied to the video display system 100 shown in FIG. 3, and can be implemented by utilizing the video display system 100. The method is described as follows.

In Step 912, the controller 112 detects whether dropping at least one frame such as the aforementioned at least one frame is required. For example, the controller 112 can detect whether dropping the aforementioned at least one frame is required according to the number of flip commands corresponding to a period of a vertical synchronization signal VSYNC (e.g. the vertical synchronization signal VSYNC shown in FIG. 5). When the number of flip commands corresponding to the period of the vertical synchronization signal VSYNC is greater than one (e.g. there are two or more flip commands received within this period), the controller 112 determines that dropping the aforementioned at least one frame is required.

In Step 914, when it is detected that dropping the at least one frame mentioned in Step 912 is required, the controller 112 removes at least one flip command from the command queue 112K and selectively removes at least one video processing command from the command queue 112K. More particularly, based upon at least one condition (e.g. one or more conditions), the controller 112 determines whether to remove the aforementioned at least one video processing command from the command queue 112K. When the aforementioned at least one condition is satisfied, the controller 112 removes the aforementioned at least one video processing command from the command queue 112K.

According to this embodiment, the aforementioned at least one flip command is utilized for flipping between a plurality of buffers within the video display system 100, such as the two buffers 122 and 124 shown in FIG. 3, where one of the plurality of buffers (e.g. one of the two buffers 122 and 124) is utilized as a display buffer at a time. Please note that, within the plurality of buffers, the buffer that is temporarily selected as the display buffer stores the data of the latest complete image for being displayed on a screen. As a result of removing the flip command mentioned in Step 914 from the command queue 112K, within the two buffers 122 and 124, the buffer that is originally selected as the display buffer can still be utilized as the display buffer before the appearance of the first coming pulse of the vertical synchronization signal VSYNC, in order to reduce the overall workload of the video display system 100, where the other buffer can still be utilized for drawing without displaying any incomplete image on the screen.

In addition, the controller 112 can parse a plurality of video processing commands of the commands $S_C$ to determine whether at least one dependence relationship (e.g. one or more dependence relationships) between a portion of the video processing commands exists, in order to determine whether to remove the aforementioned at least one video processing command from the command queue 112K. Please note that, within the command queue 112K, the aforementioned at least one video processing command typically has a higher execution priority than that of the flip command mentioned in Step 914 since the aforementioned at least one video processing command under consideration is received before the flip command mentioned in Step 914. When the aforementioned at least one condition is satisfied, the controller 112 removes the aforementioned at least one video processing command from the command queue 112K, in order to reduce the overall workload of the video display system 100.

Please note that the notation $S_{RC}$ can be utilized for representing the remaining commands in the command queue 112K. As a result of executing Step 914, the controller 112 alters the commands $S_C$ in the command queue 112K to be the remaining commands $S_{RC}$. Referring to FIG. 3, the controller 112 can send the remaining commands $S_{RC}$ to the hardware module 114. Thus, the hardware module 114 is arranged to perform video processing based upon the remaining commands $S_{RC}$ in the command queue 112K.

Figure 5:
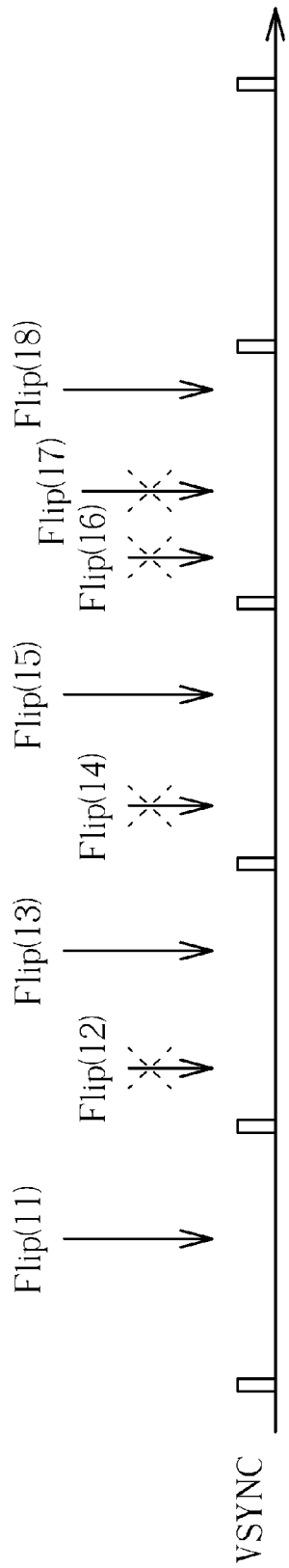
FIG. 5 illustrates exemplary operations of removing some flip commands from the command queue according to an embodiment of the present invention.

FIG. 5 illustrates exemplary operations of removing some flip commands from the command queue 112K according to an embodiment of the present invention, where some frames associated to the removed flip command can be dropped. As shown in FIG. 5, the flip commands under consideration comprise the flip commands Flip(11), Flip(12), . . . , and Flip(18). For example, there is only one flip command Flip(11) in a first period of the vertical synchronization signal VSYNC, and the controller 112 can determine that no frame should be dropped, where the controller 112 keeps the only flip command Flip(11) of this period. In a second period of the vertical synchronization signal VSYNC, there are two flip commands Flip(12) and Flip(13), and the controller 112 can keep only the last flip command Flip(13) of this period. Thus, the controller 112 determines that dropping the frame associated to the flip command Flip(12) is required, and removes the flip command Flip(12) from the command queue 112K accordingly. Similarly, in a third period of the vertical synchronization signal VSYNC, there are two flip commands Flip(14) and Flip(15), and the controller 112 can keep only the last flip command Flip(15) of this period. Thus, the controller 112 determines that dropping the frame associated to the flip command Flip(14) is required, and removes the flip command Flip(14) from the command queue 112K accordingly. In addition, in a fourth period of the vertical synchronization signal VSYNC, there are three flip commands Flip(16), Flip(17), and Flip(18), and the controller 112 can keep only the last flip command Flip(18) of this period. Thus, the controller 112 determines that dropping the frames associated to the flip commands Flip(16) and Flip(17) is required, and removes the flip commands Flip(16) and Flip(17) from the command queue 112K accordingly.

According to this embodiment, as the controller 112 keeps only the last flip command of the period under consideration, in a situation where it is determined that dropping the aforementioned at least one frame is required, the number of the aforementioned at least one flip command is equal to the number of flip commands corresponding to this period minus one. This is for illustrative purposes only, and is not meant to be a limitation of the present invention. According to a variation of this embodiment, the controller 112 may intentionally skip dropping a frame when needed. That is, the controller 112 of this variation may keep two or more flip commands of the period under consideration when needed. Therefore, in a situation where it is determined that dropping the aforementioned at least one frame is required, the number of the aforementioned at least one flip command is less than the number of flip commands corresponding to this period of the vertical synchronization signal VSYNC.

Figure 6:
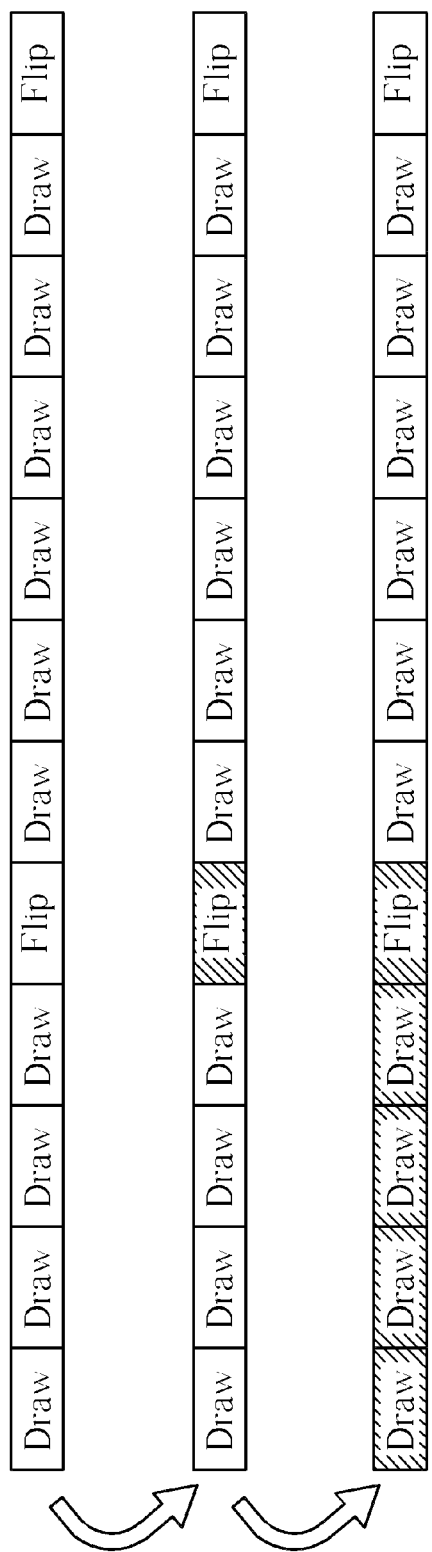
FIG. 6 illustrates exemplary operations of removing some commands from the command queue according to an embodiment of the present invention.

FIG. 6 illustrates exemplary operations of removing some commands from the command queue 112K according to an embodiment of the present invention. The notations "Draw" and "Flip" shown in FIG. 6 are utilized for representing drawing commands and flip commands, respectively. The uppermost row of commands shown in FIG. 6 can be taken as an example of at least one portion of the commands $S_C$ (e.g. a portion or all of the commands $S_C$), where no command is dropped in an initial state during the period under consideration, such as the second period or the third period mentioned in the embodiment shown in FIG. 5. In the second row of commands shown in FIG. 6, a flip command (e.g. the shaded portion in this row of commands) is removed from the command queue 112K, and within the flip commands that exist in the initial state, the controller 112 keeps only the last flip command of this period. In addition, when the aforementioned at least one condition is satisfied, the controller 112 removes the aforementioned at least one video processing command, such as the left four drawing commands (labeled "Draw") in the bottommost row of commands shown in FIG. 6, from the command queue 112K. As a result, the shaded portion in the bottommost row of commands are removed from the command queue 112K, in order to reduce the overall workload of the video display system 100. Please note that, in a situation where the aforementioned at least one video processing command is to be removed from the command queue 112K, within the command queue 112K, the aforementioned at least one video processing command (e.g. the left four drawing commands (labeled "Draw") in the second row of commands shown in FIG. 6) has a higher execution priority than that of the removed flip command of this embodiment.

In this embodiment, the period under consideration may represent the second period or the third period mentioned in the embodiment shown in FIG. 5. For example, in a situation where the period under consideration represents the second period in the embodiment shown in FIG. 5, the removed flip command in the second row of commands shown in FIG. 6 may represent the flip command Flip(12), where the last flip command of this period may represent the flip command Flip(13) shown in FIG. 5. In another example, in a situation where the period under consideration represents the third period in the embodiment shown in FIG. 5, the removed flip command in the second row of commands shown in FIG. 6 may represent the flip command Flip(14), where the last flip command of this period may represent the flip command Flip(15) shown in FIG. 5. This is for illustrative purposes only, and is not meant to be a limitation of the present invention. For example, in a situation where the period under consideration represents the fourth period in the embodiment shown in FIG. 5, the removed flip command in the second row of commands shown in FIG. 6 may represent the flip command Flip(16), where the rightmost command in this row of commands shown in FIG. 6 may represent the flip command Flip(17) shown in FIG. 5 since the last flip command Flip(18) has not been received at this moment. That is, the controller 112 may temporarily keep the last received flip command of this period, and when the next flip command of this period is received, the controller 112 may drop the flip command that has been temporarily kept. In another example, in a situation where the period under consideration represents the fourth period in the embodiment shown in FIG. 5, the removed flip command in the second row of commands shown in FIG. 6 may represent the flip command Flip(17), and the last flip command of this period may represent the flip command Flip(18) shown in FIG. 5.

Figure 7A:
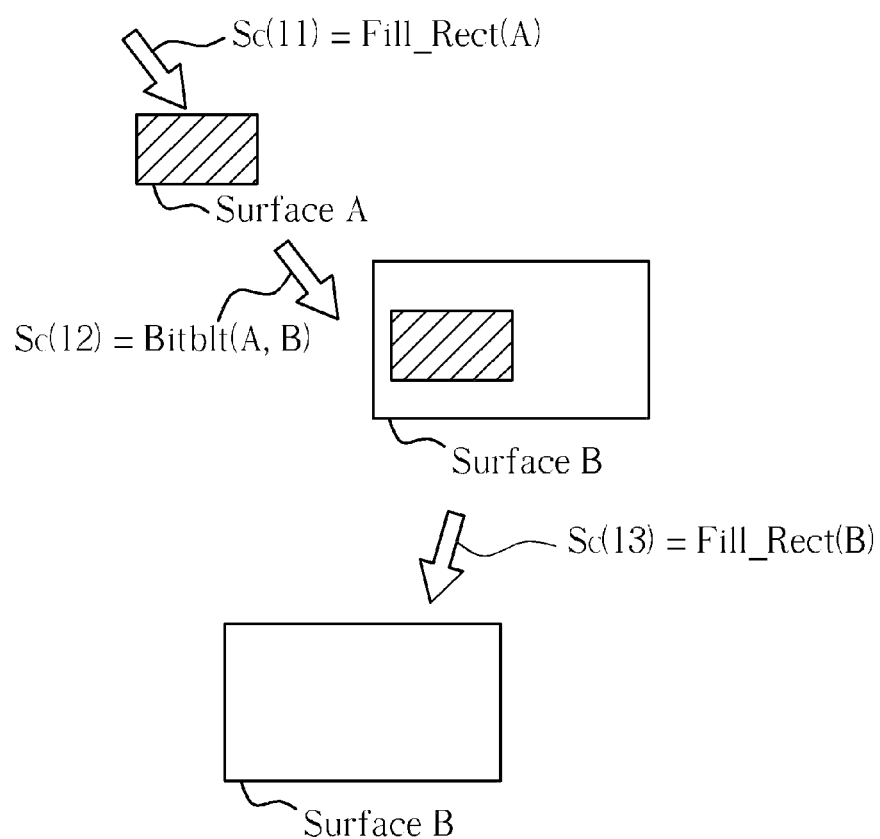
FIGS. 7A-7C illustrate some video processing operations involved with the method shown in FIG. 4 according to different embodiments of the present invention.
Figure 7B:
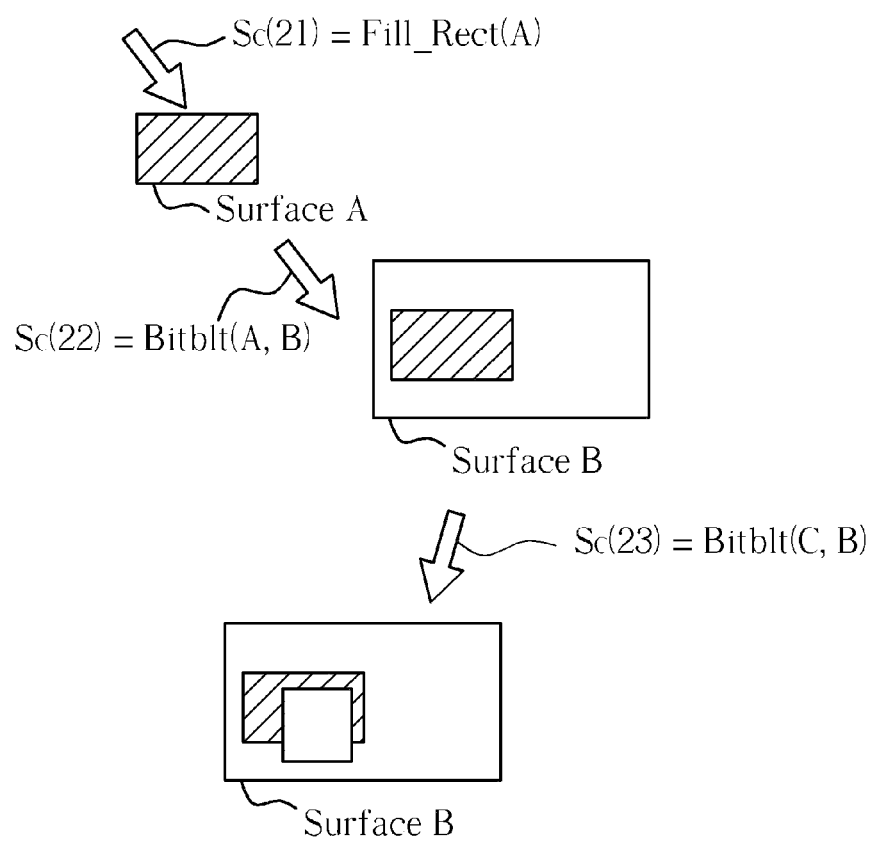
Figure 7C:
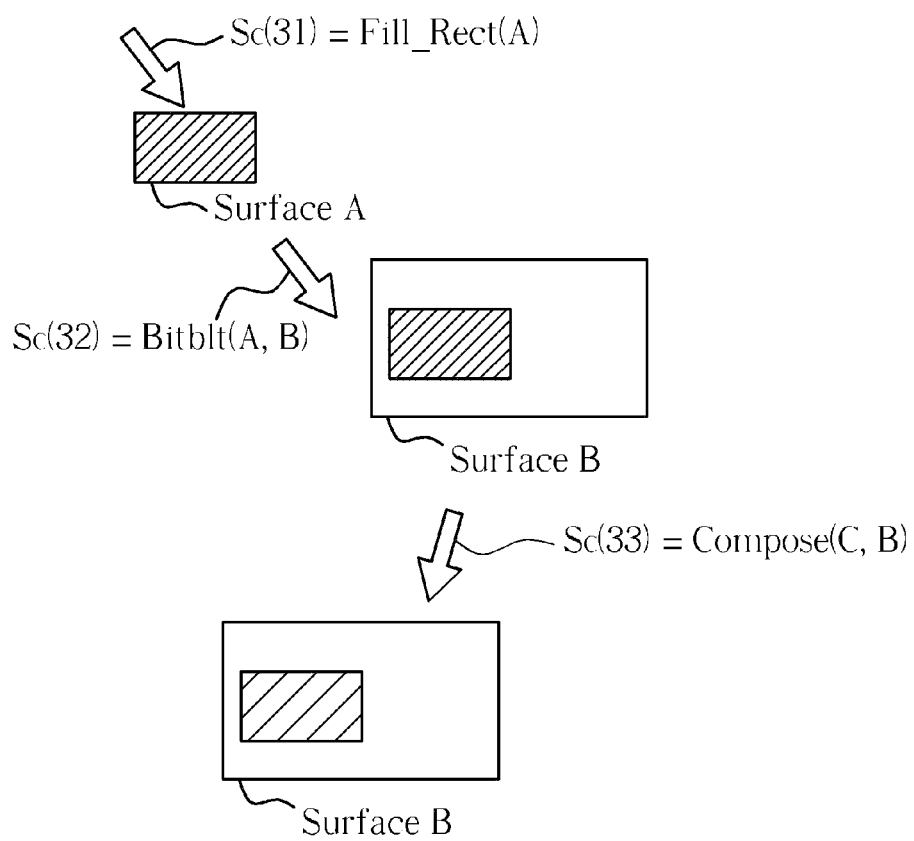

FIGS. 7A-7C illustrate some video processing operations involved with the method shown in FIG. 4 according to different embodiments of the present invention. In these embodiments, some video processing commands such as "Fill_Rect", "Bitblt", and "Compose" shown in FIGS. 7A-7C are taken as examples of the video processing command mentioned in Step 914. Here, the video processing command Fill_Rect may represent a video processing operation of filling a rectangular with a color, the video processing command Bitblt may represent a video processing operation of pasting at least a portion of a surface to another surface, and the video processing command Compose may represent a video processing operation of composing or mixing a plurality of images.

Referring to FIG. 7A, the commands $S_C$ of this embodiment comprise the commands $S_C(11)$, $S_C(12)$, and $S_C(13)$, which are the video processing commands Fill_Rect(A), Bitblt(A, B), and Fill_Rect(B), respectively. In a situation where the commands $S_C(11)$, $S_C(12)$, and $S_C(13)$ are in the command queue 112K and are in the order as indicated by the indexes of the commands $S_C$ (e.g. the indexes 11, 12, and 13), the controller 110 analyzes the commands $S_C(11)$, $S_C(12)$, and $S_C(13)$, in order to determine whether to remove the aforementioned at least one video processing command from the command queue 112K in Step 914. The command $S_C(11)$ represents the video processing operation of filling a rectangular with a specific color on the surface A, and the command $S_C(12)$ represents the video processing operation of pasting at least a portion of the surface A to the surface B. In addition, the command $S_C(13)$ represents the video processing operation of filling a rectangular with a specific color on the surface B. It is detected that the dependence relationship between the commands $S_C(11)$, $S_C(12)$, and $S_C(13)$ exists. In this embodiment, the aforementioned at least one condition comprises an overlap condition. As the command $S_C(13)$ causes a full overlap on the surface B, the overlap condition is satisfied, and therefore, the commands $S_C(11)$ and $S_C(12)$ can be removed from the command queue 112K in Step 914. Similar descriptions for this embodiment are not repeated in detail.

Referring to FIG. 7B, the commands $S_C$ of this embodiment comprise the commands $S_C(21)$, $S_C(22)$, and $S_C(23)$, which are the video processing commands Fill_Rect(A), Bitblt(A, B), and Bitblt(C, B), respectively. In a situation where the commands $S_C(21)$, $S_C(22)$, and $S_C(23)$ are in the command queue 112K and are in the order as indicated by the indexes of the commands $S_C$ (e.g. the indexes 21, 22, and 23), the controller 110 analyzes the commands $S_C(21)$, $S_C(22)$, and $S_C(23)$, in order to determine whether to remove the aforementioned at least one video processing command from the command queue 112K in Step 914. The command $S_C(21)$ represents the video processing operation of filling a rectangular with a specific color on the surface A, and the command $S_C(22)$ represents the video processing operation of pasting at least a portion of the surface A to the surface B. In addition, the command $S_C(23)$ represents the video processing operation of pasting at least a portion of the surface C to the surface B. It is detected that the dependence relationship between the commands $S_C(21)$, $S_C(22)$, and $S_C(23)$ exists. In this embodiment, the aforementioned at least one condition comprises the overlap condition mentioned in the embodiment shown in FIG. 7A. As the command $S_C(23)$ causes a partial overlap on the surface B, the overlap condition mentioned above is not satisfied, and therefore, the commands $S_C(21)$ and $S_C(22)$ cannot be removed from the command queue 112K in Step 914. Similar descriptions for this embodiment are not repeated in detail.

Referring to FIG. 7C, the commands $S_C$ of this embodiment comprise the commands $S_C(31)$, $S_C(32)$, and $S_C(33)$, which are the video processing commands Fill_Rect(A), Bitblt(A, B), and Compose(C, B), respectively. In a situation where the commands $S_C(31)$, $S_C(32)$, and $S_C(33)$ are in the command queue 112K and are in the order as indicated by the indexes of the commands $S_C$ (e.g. the indexes 31, 32, and 33), the controller 110 analyzes the commands $S_C(31)$, $S_C(32)$, and $S_C(33)$, in order to determine whether to remove the aforementioned at least one video processing command from the command queue 112K in Step 914. The command $S_C(31)$ represents the video processing operation of filling a rectangular with a specific color on the surface A, and the command $S_C(32)$ represents the video processing operation of pasting at least a portion of the surface A to the surface B. In addition, the command $S_C(33)$ represents the video processing operation of altering the video data of the surface B by composing or mixing the surface B with the surface C. It is detected that the dependence relationship between the commands $S_C(31)$, $S_C(32)$, and $S_C(33)$ exists. In this embodiment, the aforementioned at least one condition comprises a transparency condition. As the command $S_C(33)$ does not totally cancels the resultant image generated by the command $S_C(32)$, the transparency condition is not satisfied, and therefore, the commands $S_C(31)$ and $S_C(32)$ cannot be removed from the command queue 112K in Step 914. Similar descriptions for this embodiment are not repeated in detail.

It is an advantage of the present invention that, based upon the architecture of the embodiments/variations disclosed above, the goal of maintaining the overall performance can be achieved by removing useless commands from the command queue before they are executed. More particularly, in a situation where associated hardware resources are implemented with cheap or low end components, the present invention method and the associated video processing circuit and the associated video display system can still maintain the overall performance since the overall workload can be reduced. Therefore, the related art problems can no longer be an issue.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A method for performing video display control within a video display system, the method comprising:
   detecting whether dropping at least one frame is required; and when it is detected that dropping the at least one frame is required, removing at least one flip command from a command queue and selectively removing at least one video processing command from the command queue.

2. The method of claim 1, wherein the step of detecting whether dropping the at least one frame is required further comprises:
   detecting whether dropping the at least one frame is required according to a number of flip commands corresponding to a period of a vertical synchronization signal.

3. The method of claim 2, wherein the step of detecting whether dropping the at least one frame is required further comprises:
   when the number of flip commands corresponding to the period of the vertical synchronization signal is greater than one, determining that dropping the at least one frame is required.

4. The method of claim 2, wherein a number of the at least one flip command is less than the number of flip commands corresponding to the period of the vertical synchronization signal.

5. The method of claim 1, further comprising:
   parsing a plurality of video processing commands to determine whether at least one dependence relationship between a portion of the video processing commands exists, in order to determine whether to remove the at least one video processing command from the command queue.

6. The method of claim 5, wherein within the command queue, the at least one video processing command has a higher execution priority than that of the flip command.

7. The method of claim 1, wherein selectively removing the at least one video processing command from the command queue further comprises:
   based upon at least one condition, determining whether to remove the at least one video processing command from the command queue; and
   when the at least one condition is satisfied, removing the at least one video processing command from the command queue.

8. The method of claim 1, wherein in a situation where the at least one video processing command is to be removed from the command queue, within the command queue, the at least one video processing command has a higher execution priority than that of the flip command.

9. The method of claim 1, wherein the at least one flip command is utilized for flipping between a plurality of buffers within the video display system; and one of the buffers is utilized as a display buffer at a time.

10. A video processing circuit, the video processing circuit being positioned within a video display system, the video processing circuit comprising:
    a hardware module arranged to perform video processing for the video display system; and
    a controller arranged to detect whether dropping at least one frame is required, wherein when it is detected that dropping the at least one frame is required, the controller removes at least one flip command from a command queue and selectively removes at least one video processing command from the command queue;
    wherein the hardware module is arranged to perform video processing based upon commands within the command queue.

11. The video processing circuit of claim 10, wherein the controller detects whether dropping the at least one frame is required according to a number of flip commands corresponding to a period of a vertical synchronization signal.

12. The video processing circuit of claim 11, wherein when the number of flip commands corresponding to the period of the vertical synchronization signal is greater than one, the controller determines that dropping the at least one frame is required.

13. The video processing circuit of claim 11, wherein a number of the at least one flip command is less than the number of flip commands corresponding to the period of the vertical synchronization signal.

14. The video processing circuit of claim 10, wherein the controller parses a plurality of video processing commands to determine whether at least one dependence relationship between a portion of the video processing commands exists, in order to determine whether to remove the at least one video processing command from the command queue.

15. The video processing circuit of claim 14, wherein within the command queue, the at least one video processing command has a higher execution priority than that of the flip command.

16. The video processing circuit of claim 10, wherein based upon at least one condition, the controller determines whether to remove the at least one video processing command from the command queue; and when the at least one condition is satisfied, the controller removes the at least one video processing command from the command queue.

17. The video processing circuit of claim 10, wherein in a situation where the at least one video processing command is to be removed from the command queue, within the command queue, the at least one video processing command has a higher execution priority than that of the flip command.

18. The video processing circuit of claim 10, wherein the at least one flip command is utilized for flipping between a plurality of buffers within the video display system; and one of the buffers is utilized as a display buffer at a time.

19. A video display system, comprising:
    a video processing circuit, comprising:
    a hardware module arranged to perform video processing for the video display system; and
    a controller arranged to detect whether dropping at least one frame is required, wherein when it is detected that dropping the at least one frame is required, the controller removes at least one flip command from a command queue and selectively removes at least one video processing command from the command queue;
    wherein the hardware module is arranged to perform video processing based upon commands within the command queue.

20. The video display system of claim 19, wherein the controller detects whether dropping the at least one frame is required according to a number of flip commands corresponding to a period of a vertical synchronization signal.

21. The video display system of claim 20, wherein when the number of flip commands corresponding to the period of the vertical synchronization signal is greater than one, the controller determines that dropping the at least one frame is required.

22. The video display system of claim 20, wherein a number of the at least one flip command is less than the number of flip commands corresponding to the period of the vertical synchronization signal.

23. The video display system of claim 19, wherein the controller parses a plurality of video processing commands to determine whether at least one dependence relationship between a portion of the video processing commands exists, in order to determine whether to remove the at least one video processing command from the command queue.

24. The video display system of claim 23, wherein within the command queue, the at least one video processing command has a higher execution priority than that of the flip command.

25. The video display system of claim 19, wherein based upon at least one condition, the controller determines whether to remove the at least one video processing command from the command queue; and when the at least one condition is satisfied, the controller removes the at least one video processing command from the command queue.

26. The video display system of claim 19, wherein in a situation where the at least one video processing command is to be removed from the command queue, within the command queue, the at least one video processing command has a higher execution priority than that of the flip command.

27. The video display system of claim 19, wherein the at least one flip command is utilized for flipping between a plurality of buffers within the video display system; and one of the buffers is utilized as a display buffer at a time.

* * * * *